(12) United States Patent
Gonidec et al.

(10) Patent No.: US 9,334,831 B2
(45) Date of Patent: May 10, 2016

(54) NACELLE FOR A BYPASS TURBOFAN ENGINE

(71) Applicant: AIRCELLE, Gonfreville l'Orcher (FR)

(72) Inventors: Patrick Gonidec, Bretx (FR); Alexandre Bellanger, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 418 days.

(21) Appl. No.: 13/917,905

(22) Filed: Jun. 14, 2013

(65) Prior Publication Data

US 2013/0280052 A1 Oct. 24, 2013

Related U.S. Application Data

(63) Continuation of application No. PCT/FR2011/052706, filed on Nov. 18, 2011.

(30) Foreign Application Priority Data

Dec. 14, 2010 (FR) ...................................... 10 60478

(51) Int. Cl.
*B64D 29/06* (2006.01)
*B64D 33/02* (2006.01)
*F02K 1/76* (2006.01)
*F02K 1/70* (2006.01)
*F02K 1/72* (2006.01)
*F01D 25/24* (2006.01)

(52) U.S. Cl.
CPC ................ *F02K 1/766* (2013.01); *B64D 29/06* (2013.01); *F01D 25/24* (2013.01); *F02K 1/70* (2013.01); *F02K 1/72* (2013.01); *Y02T 50/671* (2013.01)

(58) Field of Classification Search
CPC ............. F02K 1/766; F02K 1/70; F02K 1/68; F02K 1/72; B64D 33/04
USPC ....... 244/110 B, 53 R; 60/226.2; 239/265.29, 239/265.31, 265.33
See application file for complete search history.

(56) References Cited

U.S. PATENT DOCUMENTS 3,344,604 A * 10/1967 Mattia ....................... F02K 1/70
239/265.27
4,629,146 A * 12/1986 Lymons ................. B64D 29/08
180/69.2
4,884,772 A * 12/1989 Kraft ....................... B64C 23/06
244/130

(Continued)

FOREIGN PATENT DOCUMENTS

| EP | 0771945 A1 | 5/1997 |
| EP | 0852290 A1 | 7/1998 |
| RU | 2 469 916 C2 | 12/2012 |

*Primary Examiner* — Katherine Mitchell
*Assistant Examiner* — Justin Rephann
(74) *Attorney, Agent, or Firm* — Burris Law, PLLC

(57) ABSTRACT

A nacelle for an aircraft bypass turbofan engine includes an upstream section via which an airflow enters, a middle section surrounding the fan of the turbofan and a downstream section having an inner structure and an outer structure delimiting a flow duct in which the air flows. The outer structure includes one cowling movably mounted on the inner fixed structure. The nacelle also has a top to accept a pylon for attaching a wing of the aircraft. The nacelle further includes one first panel mounted on the inner structure on one side of the nacelle and one second panel mounted on the other side of the nacelle. The first panel undergoes a physical interference with a part of the wing. The second panel increases the air removed from this other side of the nacelle during thrust reversal.

13 Claims, 7 Drawing Sheets

(56) References Cited

U.S. PATENT DOCUMENTS

| | | | | |
|---|---|---|---|---|
| 5,046,689 A * | 9/1991 | Shine | B64D 29/08 244/129.4 |
| 5,863,014 A * | 1/1999 | Standish | F02K 1/70 239/265.29 |
| 8,316,632 B2 * | 11/2012 | West | F02K 1/32 60/226.2 |
| 2008/0258016 A1 * | 10/2008 | Gukeisen | B64D 29/00 244/53 R |
| 2009/0193789 A1 * | 8/2009 | Pero | F02K 1/70 60/226.2 |
| 2010/0001123 A1 * | 1/2010 | Hillereau | B64D 29/06 244/54 |
| 2010/0115958 A1 * | 5/2010 | Parham | F02K 1/09 60/771 |
| 2011/0120081 A1 * | 5/2011 | Schwark, Jr. | F02K 1/09 60/226.3 |
| 2011/0277448 A1 * | 11/2011 | Roberts | B64D 29/06 60/226.2 |
| 2012/0023900 A1 * | 2/2012 | Flin | B64D 29/06 60/226.2 |
| 2013/0193224 A1 * | 8/2013 | Aten | F02K 1/72 239/1 |
| 2014/0216005 A1 * | 8/2014 | Sidelkovskiy | F02K 1/72 60/226.2 |
| 2014/0239083 A1 * | 8/2014 | Suciu | F02K 1/62 239/11 |

* cited by examiner

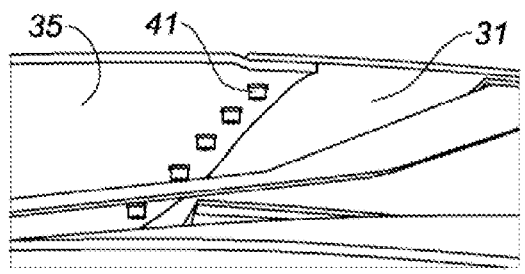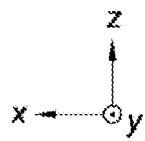
Fig. 4
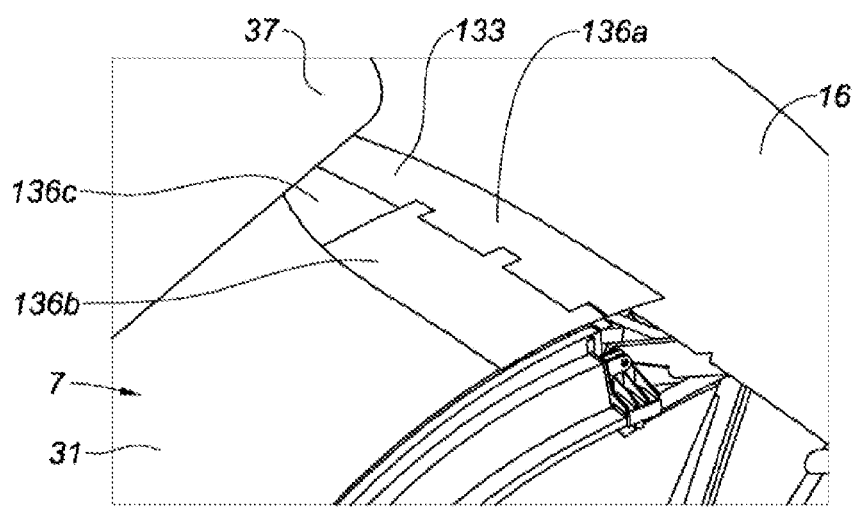
Fig. 5
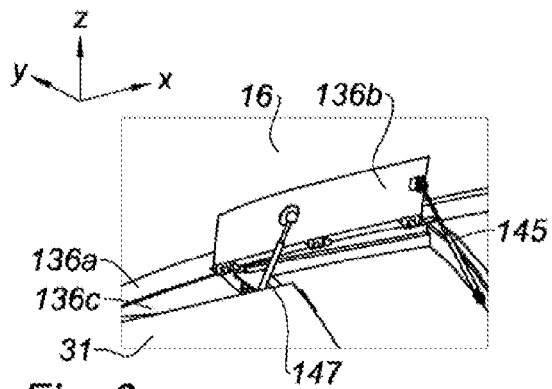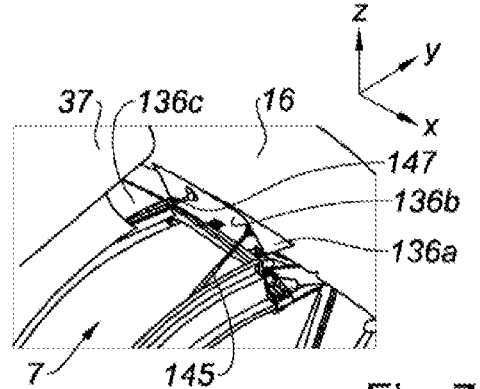
Fig. 6  Fig. 7
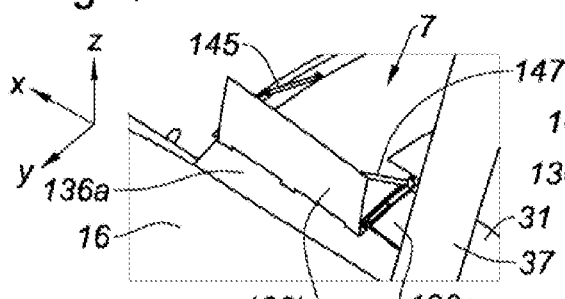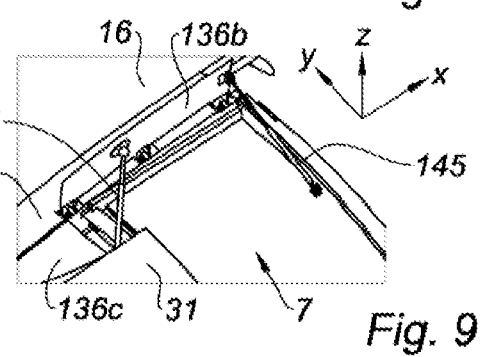
Fig. 8  Fig. 9

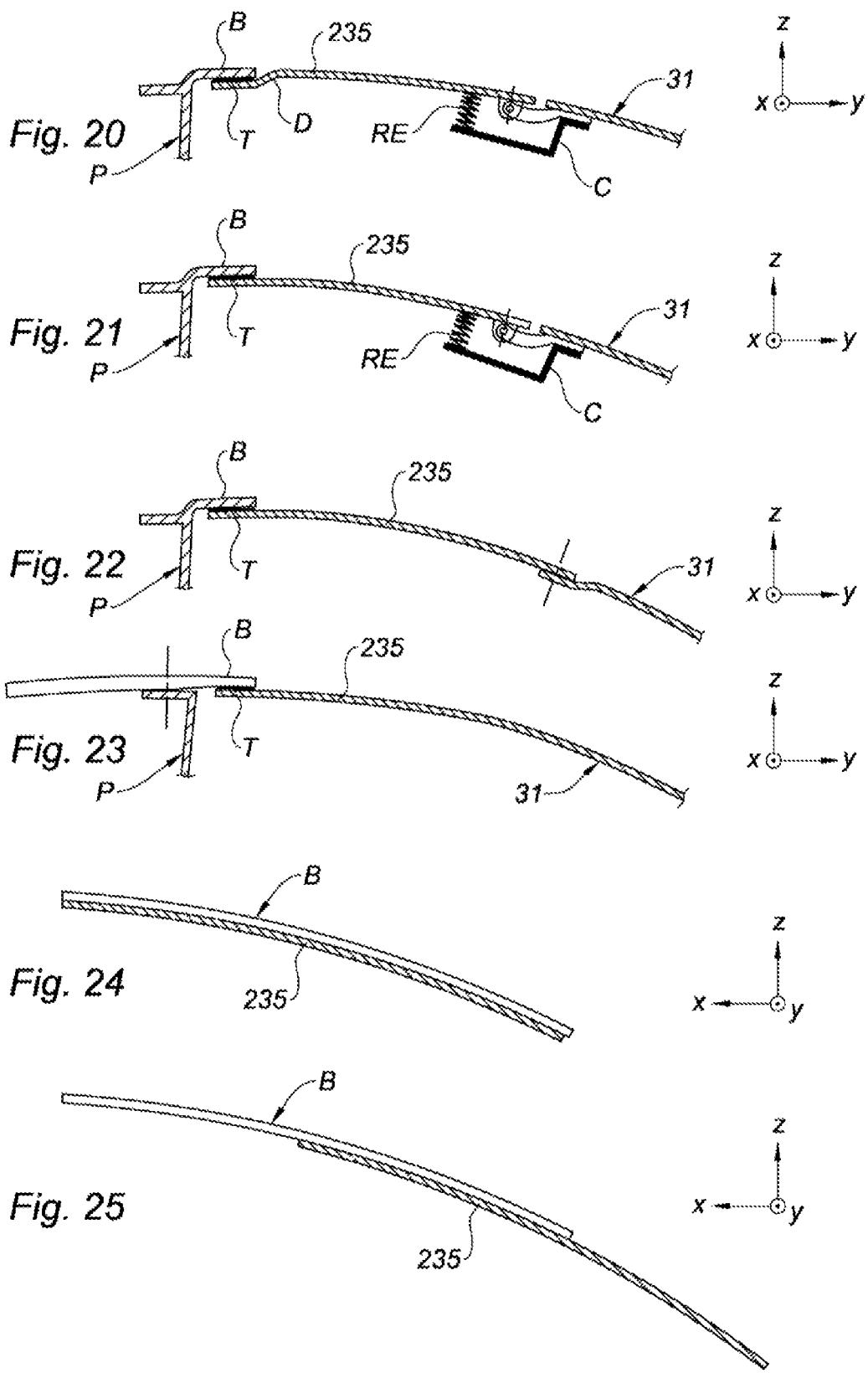

NACELLE FOR A BYPASS TURBOFAN ENGINE

CROSS-REFERENCE TO RELATED APPLICATIONS

This application is a continuation of International Application No. PCT/FR2011/052706, filed on Nov. 18, 2011, which claims the benefit of FR 10/60478, filed on Dec. 14, 2010. The disclosures of the above applications are incorporated herein by reference.

FIELD

The present disclosure relates to a nacelle for bypass turbofan engine as well as an aircraft comprising such a nacelle.

BACKGROUND

The statements in this section merely provide background information related to the present disclosure and may not constitute prior art.

An aircraft is moved by several turbofan engines each housed in a nacelle also housing a set of related actuating devices connected to its operation and performing various functions when the turbofan engine is running or stopped. These related actuating devices in particular comprise a mechanical thrust reverser actuating system.

A nacelle generally has a tubular structure with a longitudinal axis comprising an air inlet upstream from the turbofan engine, a middle section designed to surround the fan of the turbofan engine, and a downstream section housing thrust reversal means and designed to surround the combustion chamber of the turbofan engine. The tubular structure generally ends with a jet nozzle whereof the output is situated downstream from the turbofan engine.

The nacelle also typically includes a top designed to receive a fastening pylon making it possible to fasten the nacelle and the turbofan engine to a wing of the aircraft.

The term "downstream" here refers to the direction corresponding to the direction of the cold air flow penetrating the turbofan engine. The term "upstream" designates the opposite direction.

Modern nacelles are designed to house a bypass turbofan engine capable of generating, by the rotating blades of the fan, a hot air flow (also called "primary flow") coming from the combustion chamber of the turbofan engine, and a cold air flow ("secondary flow") that circulates outside the turbofan engine through an annular passage, also called "tunnel."

A turbofan engine typically includes a so-called "upstream" part, comprising the blades of the fan, and a so-called "downstream" part, housing the gas generator.

The downstream section of the nacelle for such an engine generally has an outer structure, called Outer Fixed Structure (OFS), and a concentric inner structure, called Inner Fixed Structure (IFS), surrounding the structure of the engine strictly speaking downstream from the fan. The inner and outer structures define a tunnel designed to channel the cold air flow that circulates outside the engine. The outer structure in some cases includes a thrust reverser comprising one or more cowls sliding along the longitudinal axis of the nacelle between the position allowing a reversed flow of air to escape and a position preventing such escape.

Such a thrust reverser makes it possible, owing to the reversed flow of air, to reduce the braking distance of the aircraft upon landing.

An airplane wing is also generally equipped with spoilers that make it possible to orient the aircraft. A spoiler is situated on the front face of the wing. When a spoiler is in the lowered position, it becomes very close to the nacelle, in particular at the fastening of the latter under the wing of the aircraft, only on the nacelle side.

This risks creating a physical interference, as well as an aerodynamic interference with the sliding cowl of the thrust reverser, when the latter slides toward the thrust reversal position.

One proposed solution to eliminate this interference is to make the upper part of the nacelle stationary, i.e., the top of the latter corresponding to the fastening area of the nacelle under the wing of the aircraft, while widening the inner fixed structure.

The aircraft being symmetrical, all of the nacelles mounted thereon experience this interference phenomenon, with the result that all of the nacelles have a stationary area with respect to the thrust reverser on either side of the top of the nacelle.

The stationary area of the nacelle therefore does not participate in the thrust reversal performance. In order to offset this drawback, it is necessary to increase the travel length of the thrust reverser.

Such a modification causes an increase in the mass of the nacelle and a decrease in the effectiveness of the counter-thrust.

One aim of the present disclosure is therefore to provide a nacelle not having the aforementioned drawbacks.

SUMMARY

The present disclosure provides a nacelle for a bypass turbofan engine including an upstream section through which the flow of air is designed to penetrate, a middle section designed to surround the fan of the turbofan engine, and a downstream section comprising an inner structure and an outer structure delimiting a tunnel through which the flow of air is designed to flow, the outer structure comprising at least one cowl mounted on the inner structure and movable along the longitudinal axis of the nacelle so as to allow the evacuation of at least part of the flow of air circulating in the tunnel during a thrust inversion phase of the nacelle, the nacelle also having a top designed to receive a fastening pylon for a wing of the aircraft, said nacelle comprising:
 at least one first panel mounted on the inner structure of one side of the nacelle, with respect to the top, that is designed to undergo a more significant physical interference with an element of the wing than the other side of the nacelle, said panel being arranged to limit the physical interference of said cowl with said wing element during thrust reversal, and
 at least one second panel mounted on the other side of the nacelle, with respect to the top, said panel being arranged to increase the air discharged from the other side of the nacelle during thrust reversal.

Owing to the presence of the first and second panels, the nacelle according to the present disclosure advantageously makes it possible to increase the available surface for the flow of air discharged during thrust reversal, in particular on the side of the nacelle where the flow of air does not encounter interference with certain elements of the wing. It is therefore no longer necessary to increase the mass of the nacelle or to decrease the counterthrust performance.

According to other features of the present disclosure, the nacelle includes one or more of the following optional features, considered alone or according to any possible combinations:

said first panel is selected from the group comprising: a panel fixed to the inner fixed structure and stationary or at least partially movable with respect to that inner fixed structure, and a panel fixed to said moving cowl and stationary or at least partially movable with respect to said moving cowl;

said second panel is selected from the group comprising: a panel fixed to the moving cowl, a panel fixed to the inner structure and comprising at least one movable portion with respect to said inner structure, and a panel movably mounted on said moving structure;

the second panel is secured to said moving cowl: this makes it possible to simply and effectively increase the outlet surface area of the deflected flow of air on one side of the nacelle;

mistake-proofing means are provided to indicate the position of the second panel on the nacelle, which makes it possible to simplify assembly;

the first panel and/or the second panel include at least one movable part configured to go from a closed position preventing the part of the flow of air from escaping to an open position allowing such escape, which makes it possible to still further increase the outlet surface of the flow of air;

the movable part of the first panel and/or the second panel is configured to assume several intermediate positions, which makes it possible to adapt the deflected flow of air, in particular as a function of the interference undergone;

the movable part is pivotably mounted on the inner structure around an axis substantially parallel to the axis of the nacelle, the movable part is connected to said inner structure by hinges and several connecting rods, whereof at least one connecting rod is fixed on the movable part and on the moving cowl and a second connecting rod is fixed on the movable part and on the inner structure;

the movable part is pivotably mounted on the outer skin of said moving cowl toward the inside thereof, around an axis chosen from among the group comprising a substantially parallel axis, and a substantially perpendicular axis, with respect to the axis of the nacelle;

said movable part is secured to the outer skin of said moving cowl, and movable due to its elasticity;

said movable part is guided by means selected from among the group comprising a rail and a border secured to a beam situated at the top of said nacelle;

the first and second panels have a substantially symmetrical shape with respect to the top of the nacelle, which makes it possible to have panels that are very easily interchangeable, simplifying the installation and maintenance of the nacelle.

According to another aspect, the present disclosure relates to an aircraft including a wing and a nacelle according to the present disclosure connected by a fastening pylon.

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, in which:

FIG. 4 is an enlargement of area IV seen from below of the second panel and the moving cowl of the form of the nacelle of FIG. 2;

FIGS. 5 to 9 are diagrammatic perspective views of the top of a second form of the nacelle according to the present disclosure;

Figure 15:
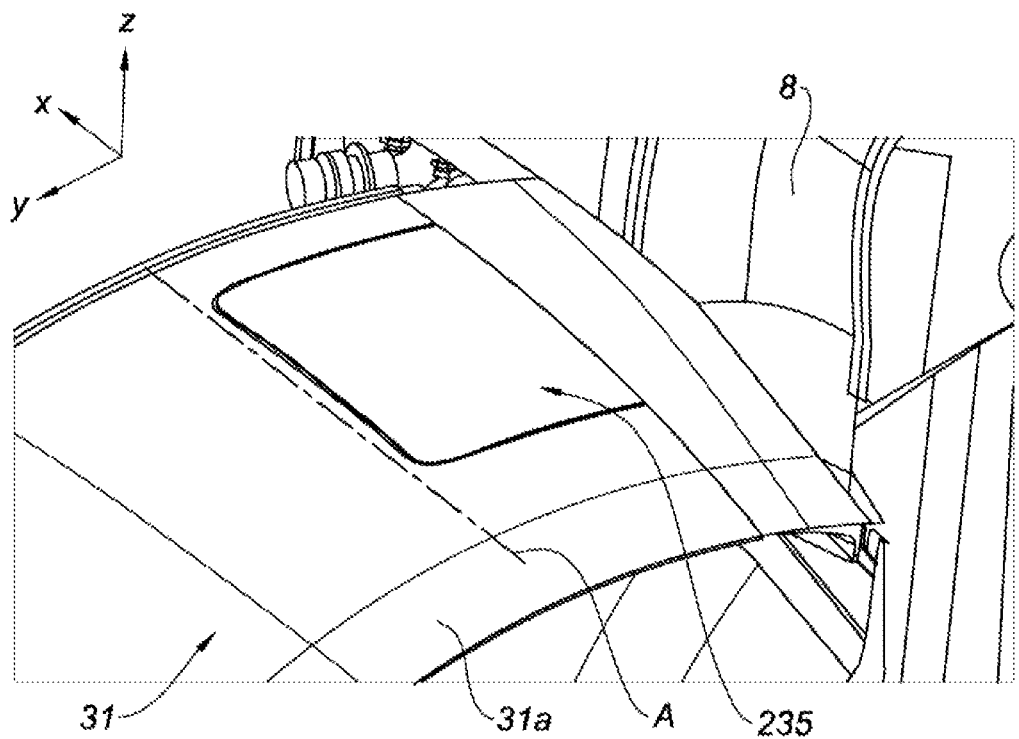
FIGS. 15 and 16 are perspective views of another form of the present disclosure, in the normal and thrust reversal configurations, respectively.
Figure 16:
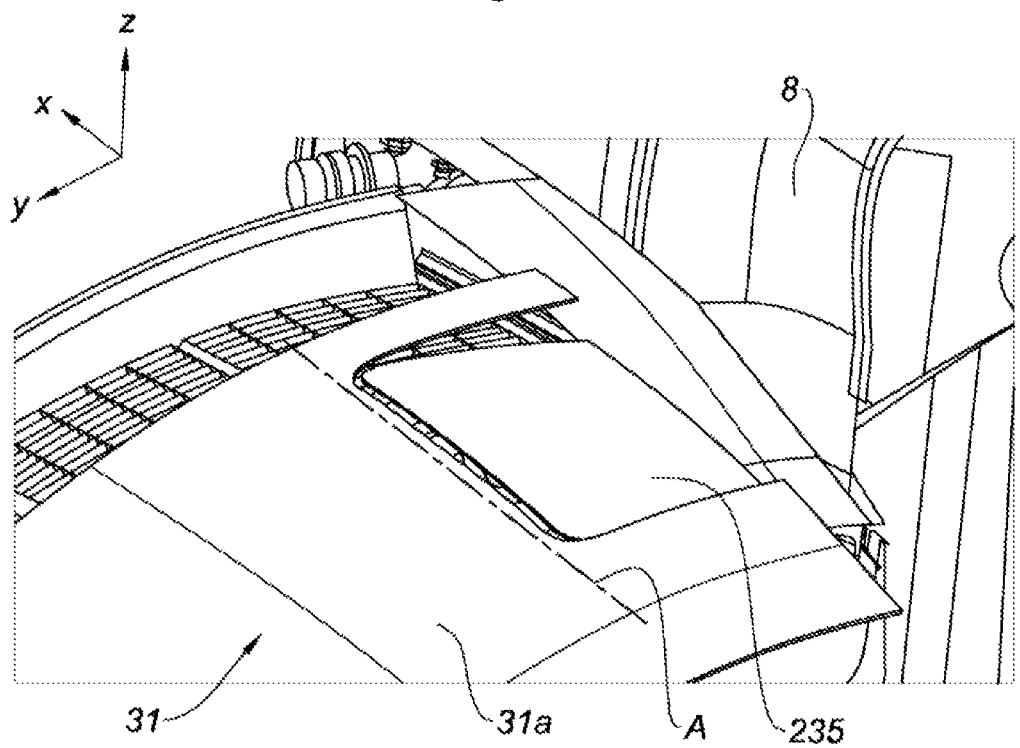

FIGS. 19 to 25 are diagrammatic views of other means for guiding the moving panel of FIGS. 15 and 16, and FIGS. 26 and 27 are perspective views similar to those of FIGS. 15 and 16, of still another form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

These figures show an orthogonal trihedron X, Y, Z, whereof the directions are respectively parallel to the axis of the nacelle, perpendicular to the axis and the vertical, and vertical.

Figure 1:
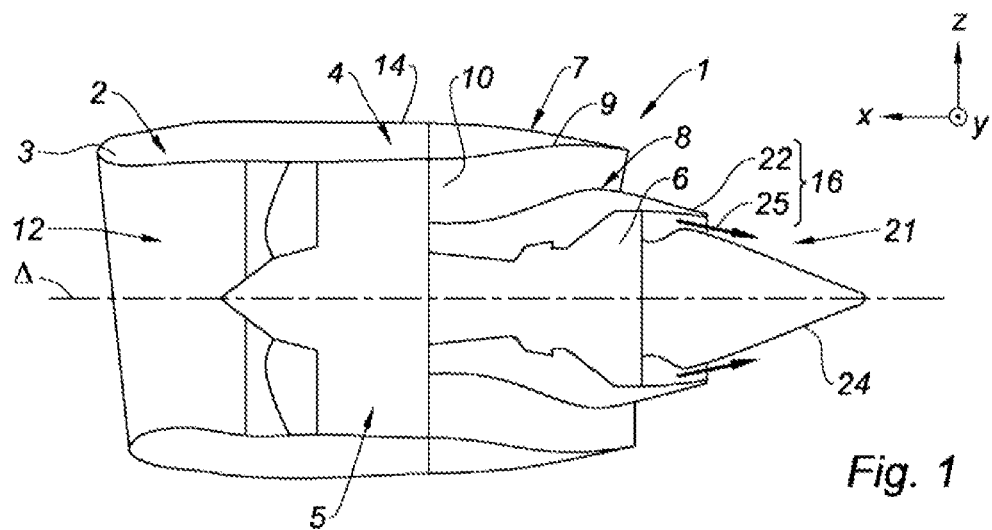
FIG. 1 is a partial diagrammatic cross-section of one form of the nacelle according to the present disclosure.

As shown in FIG. 1, a nacelle 1 according to the present disclosure has a substantially tubular shape along a longitudinal axis Δ (direction parallel to X). The nacelle 1 according to the present disclosure comprises an upstream section 2 with an air intake lip 3, a middle section 4 surrounding a fan 5 of a turbofan engine 6, and a downstream section 7. The downstream section 7 comprises an inner structure 8 (also called "inner fixed structure" or "IFS") surrounding the upstream part of the turbofan engine 6, an outer structure (also called "outer fixed structure" or "OFS") 9 and a moving cowl (not shown) including thrust reversal means. The inner structure or IFS 8 as well as the outer structure or OFS 9 are stationary relative to the moving cowl.

The IFS 8 and the OFS 9 define a tunnel 10 allowing the passage of the flow of air 12 penetrating the nacelle 1 according to the present disclosure at the air intake lip 3.

The nacelle 1 according to the present disclosure includes a top 14 designed to receive a fastening pylon 16 making it possible to fasten said nacelle 1 to a wing of the aircraft (not shown). To that end, said top 14 includes means (not shown) for fastening said pylon 16.

The nacelle 1 according to the present disclosure ends with a jet nozzle 21 comprising an outer module 22 and an inner module 24. The inner 24 and outer 22 modules define a primary air flow 25, called hot flow, leaving the turbofan engine 6.

Figure 2:
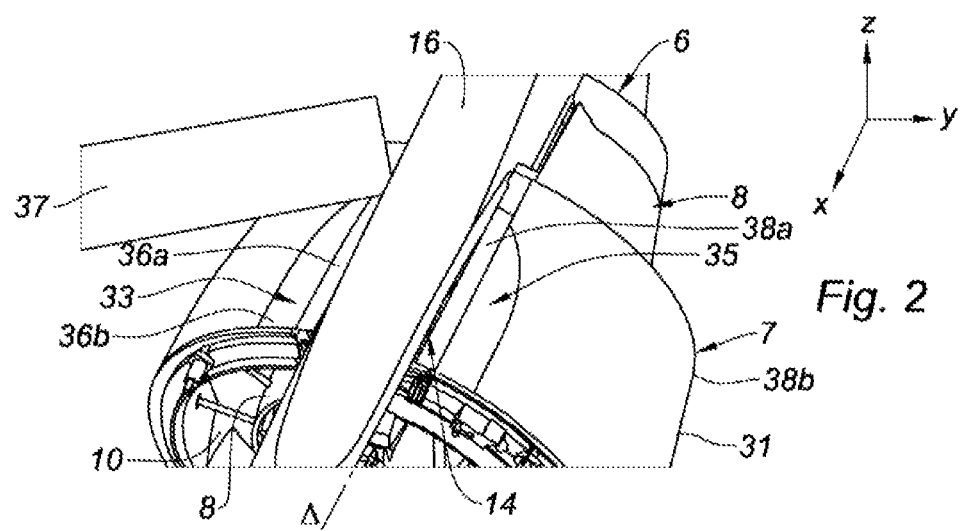
FIGS. 2 and 3 are diagrammatic perspective views of the top of a first form of the nacelle according to the present disclosure.

As shown in FIG. 2, the OFS 9 comprises at least one cowl 31 mounted on the IFS 8 and movable along the longitudinal axis Δ so as to allow the discharge of the flow of air 12 circulating in the tunnel 10 during a thrust reversal phase.

The nacelle 1 according to the present disclosure comprises at least one first panel 33 that is stationary relative to the IFS 8 and fixed thereto 8 on the side, with respect to the top 14, designed to be near the wing and a second panel 35 that is movable relative to the IFS 8 and fixed thereto 8 or to the moving cowl 31 on the side, with respect to the top 14, designed to be at a distance from the wing, the first and second panels 33 and 35 being mounted on either side of the top 14. The second panel 35 is configured so as to allow part of the flow of air 12 to be discharged.

In other words, when the flow of air 12 circulating in the tunnel 10 is deflected by the thrust reversal means of the nacelle 1 according to the present disclosure, part of that deflected flow of air passes through the passage freed by the moving cowl 31 in the deployed thereof and another part through the passage freed by the second moving panel 35. As a result, a greater portion of the flow of air 32 can thus be discharged.

The wing (not shown) of the aircraft on which the nacelle 1 according to the present disclosure is attached typically includes elements that can cause interference with the moving cowl 31. Examples include spoilers 37 facilitating the landing and braking of the aircraft (see FIGS. 2, 3 and 5 to 9). The spoilers 37 are not present on each side of the nacelle 1 of the present disclosure.

In the nacelle 1 according to the present disclosure, the first panel 33 is positioned so as to be near or under the spoiler of the wing when the nacelle is mounted on the wing. In other words, for a left wing when looking at the aircraft from the front, the first panel 33 is mounted to the left of the top 14 of the nacelle according to the present disclosure when the latter is examined from the front, i.e., facing the air intake.

For a right wing, when looking at the aircraft from the front, the first panel 33 is mounted to the right of the top 14 of the nacelle according to the present disclosure when the latter 1 is seen from the front, i.e., across from the air intake. The second panel 35 is mounted on the right in the first scenario and on the left in the second scenario.

The nacelle 1 according to the present disclosure advantageously makes it possible to preserve the available surface for the deflected flow of air 32 on the side of the top 14 where a physical interference exists between the nacelle and certain elements of the wing. It is therefore no longer necessary to increase the mass of the nacelle or to decrease the counter-thrust performance.

Preferably, the first panel 33 is mounted on the IFS 8 on the side of the nacelle 1 according to the present disclosure with respect to the top 14 designed to have a greater physical interference or bulk with an element of the wing, in the present case a spoiler 37, than on the side where the second movable panel 35 is mounted.

The first and second panels 33 and 35 may be of any shape adapted to the quantity of the deflected flow of air 32 and, in particular, with a shape complementary to the moving cowl 31. As shown in the figures, the first stationary panel 33 and the second moving panel 35 may have an oblong shape.

Figure 3:
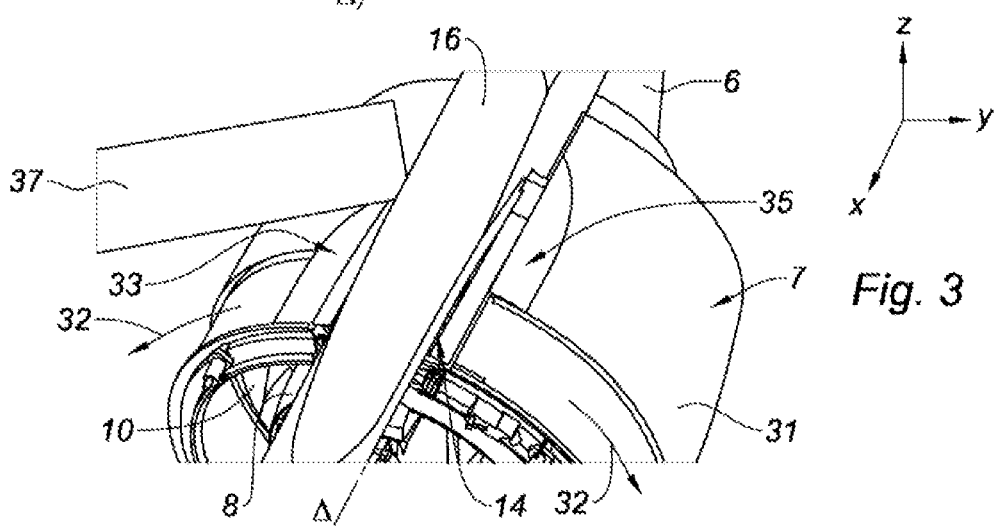
Figure 10:
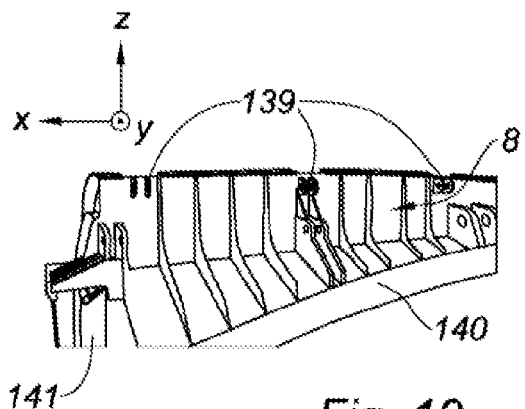
FIG. 10 is a substantially frontal perspective view of part of the inner structure of the form of the nacelle FIG. 5.
Figure 11:
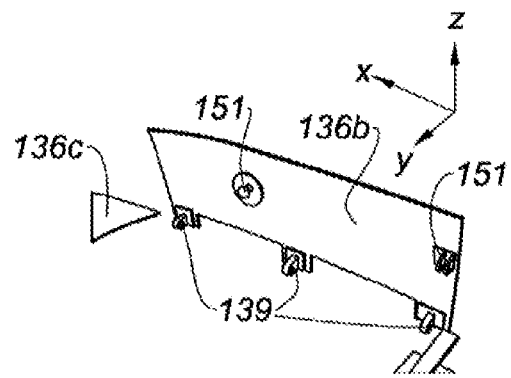
FIG. 11 is a substantially frontal perspective view of the movable part of the inner structure of the form of the nacelle of FIG. 5.
Figure 12:
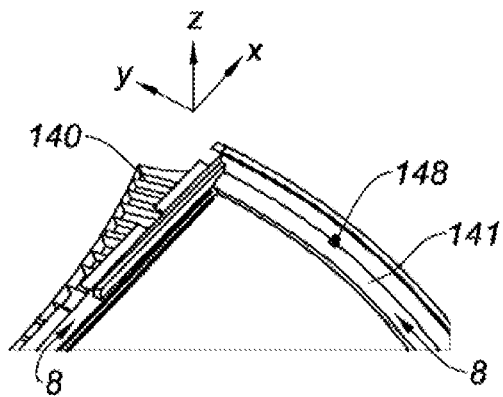
FIG. 12 is a substantially side perspective view of part of the inner structure of the form of the nacelle FIG. 10.
Figure 13:
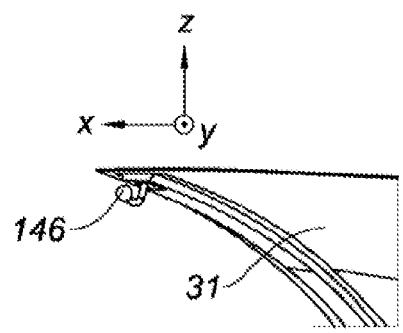
FIG. 13 is a substantially side perspective view of part of the moving cowl of the form of the nacelle FIG. 5.

According to one form shown in FIGS. 2 to 4, the second panel 35 can be translated along the longitudinal axis Δ of the nacelle, which makes it possible, simply and effectively, to increase the outlet surface of the deflected flow of air 32 on the side of the nacelle 1 according to the present disclosure. To that end, the second panel 35 is securely fastened to the moving cowl 31 by fastening means, such as bolts 41, which makes it possible to drive the moving cowl 31 and the second panel 35 simultaneously (see FIG. 4).

The first and/or second panels 33 and 35 may be formed in a single piece, or on the contrary, in several pieces. As shown in FIGS. 2 and 3, each panel 33 and 35 is formed from two parts 36 and 38. In the case of the first panel 33, the parts 36a and 36b are fastened to each other rigidly without allowing any mobility therebetween. The part 36b in contact with the moving cowl 31 is not fastened thereto, with the result that, when the moving cowl 31 moves, the parts 36a and 36b remain stationary like the IFS 8, with respect to the moving cowl 31.

In the case of the second moving panel 35, the two parts 38a and 38b are not fastened to each other, with the result that they may be movable with respect to one another. Thus, one part 38a is rigidly fastened to the IFS 8, and the other part 38b is rigidly fastened to the moving cowl 31. As a result, when the cowl 31 is movable, it advantageously drives the part 36b connected to said cowl 31. The fact that the second panel 35 and/or the first panel 33 are formed in several pieces allows a simple and quick transformation of a moving panel into a first panel and vice versa by suitable fastening of the parts with respect to one another.

The first and second panels 33 and 35 must have a substantially symmetrical shape with respect to the top 14 of the nacelle 1 of the present disclosure, which makes it possible to have first and second panels 33 and 35 that are easily interchangeable, still further simplifying the installation and maintenance of the nacelle 1 according to the present disclosure. In fact, to change panels 33 or 35, one need only modify the fastening of the panels so that a panel becomes stationary or movable as needed.

The nacelle 1 according to the present disclosure may comprise mistake-proofing means (not shown) configured to indicate the position of the second panel 35 on the nacelle 1 according to the present disclosure, which makes it possible to assist and simplify the assembly of the first and second panels 33 and 35.

The mistake-proofing means may be a finger cooperating with an interfaced bolt, for example.

According to another form shown in FIGS. 5 to 14, the second panel (not shown) and/or the first panel 133 includes at least one part 136b that is rotatable relative to the IFS 8 and configured to go from a closed position preventing part of the flow of air 132 from escaping to an open position allowing such an escape.

As a result, the nacelle 1 according to the present disclosure may have a second panel including a part that is rotatable with respect to the IFS 8 and a first panel not including such a part. It is also possible for the first and second panels 133 and 135 each to comprise a part 136b that is rotatable with respect to the IFS 8. As a result, the available surface for the deflected flow of air is still further optimized.

Figure 14:
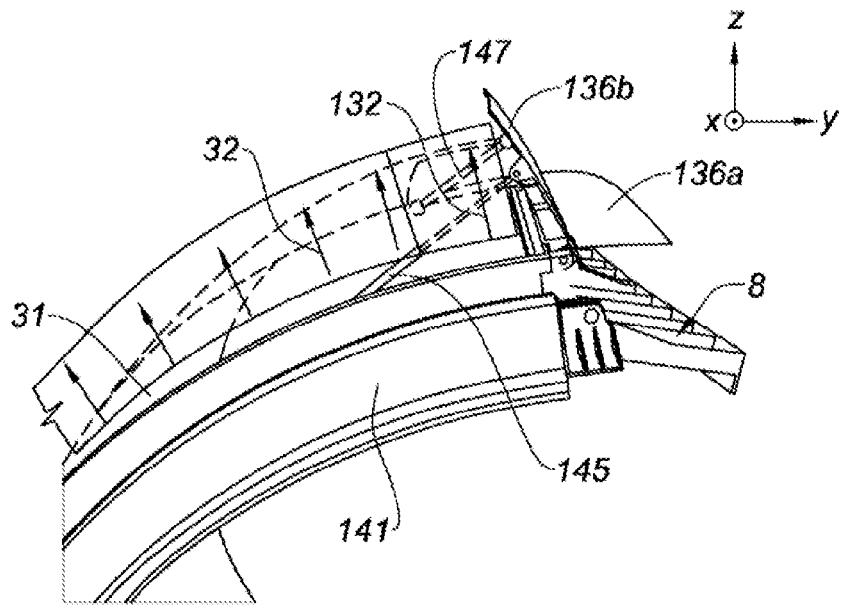
FIG. 14 is a substantially side perspective view of the form shown in FIG. 5 when the movable part 136b is positioned so as to allow part of the flow of air to escape.

In the form of FIG. 14, the first panel 133 includes a moving part 136b allowing the part 132 of the deflected flow of air 32 to escape. Thus, the escape surface of the deflected flow of air 32 is larger.

The first and/or second panels 133 may be made up of several pieces 136a, 136b, 136c, whereof one piece 136b is movable with respect to the IFS 8. As before, the fact that the second panel and/or the first panel 133 is made up of several pieces allows a simple and quick transformation of the moving panel into a stationary panel and vice versa by suitable fastening of the parts with respect to each other.

In the context of the second panel (not shown), the part in contact with the moving cowl can be fastened thereto so as to be able to slide along the longitudinal axis Δ of the nacelle 1 according to the present disclosure. To that end, said part driven by the moving cowl is not fastened to the rotatable part.

The rotatable part 136b may assume any shape and any size suitable for allowing the desired release of the deflected flow of air 132.

It is possible to limit the angle of the rotatable part 136b of the first panel 133 and/or the second panel. To that end, an additional connecting rod may be attached on the front frame.

The moving part 136b may be rotatable by means of fastening means fixed on the IFS 8 and on the moving cowl 31. As shown in FIGS. 10 to 13, the fastening means enabling the rotation of the moving part 136b may be articulation devices, of the hinge type 139, mounted on the moving part 136b and on the front frame 140 of the IFS. Thus, for example, the nacelle 1 according to the present disclosure may comprise one or more of these devices 139, in particular three.

The fastening means may also comprise several connecting rods, in particular two connecting rods whereof a first connecting rod 145 is fastened on the IFS 8, in particular on the front frame 141, by a connecting rod fastener 146, and a connecting rod 147 is fastened on the moving cowl 31 by another connecting rod fastener 148. The connecting rods 145 and 146 are also connected to the moving part 135 by means of connecting rod fasteners 151. This makes it possible to rotate the moving part 136b substantially simultaneously with the moving cowl 31.

In other words, it is possible to convert the translation of the moving cowl 31 into a rotation of the second articulated panel.

Advantageously in this embodiment, it is not necessary to have a mistake-proofing device if the second moving panel and the first stationary panel are symmetrical. In fact, if one wishes to prevent a part from being rotatable, said part need only be securely fastened to the IFS 8 and the connecting rods 145 and 147 disengaged. As a result, the uninstallation and installation of the first and first panels 135 and 133 are further facilitated.

In the form of FIGS. 15 and 16, at least the second panel 235 is pivotably mounted on the outer skin 31a of the moving cowl 31, around an axis Δ substantially parallel to the axis Δ of the nacelle, and that panel is opened toward the inside of the sliding cowl 31, when the latter goes from its normal position (FIG. 15) to its thrust reversal position (FIG. 16).

Figure 17:
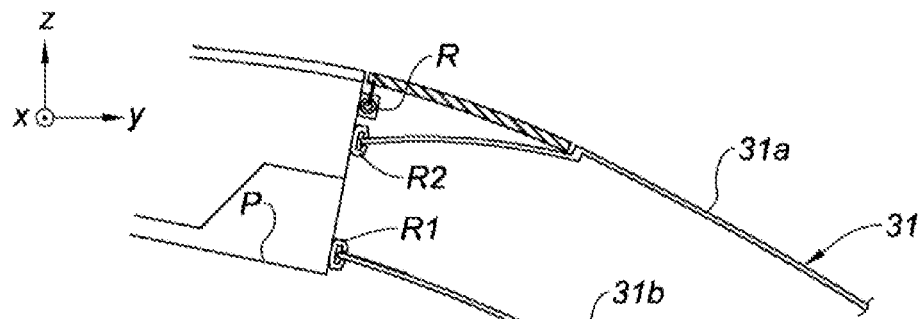
FIGS. 17 and 18 are diagrammatic views of means for guiding the moving panel of FIGS. 15 and 16.
Figures 18, 18A:
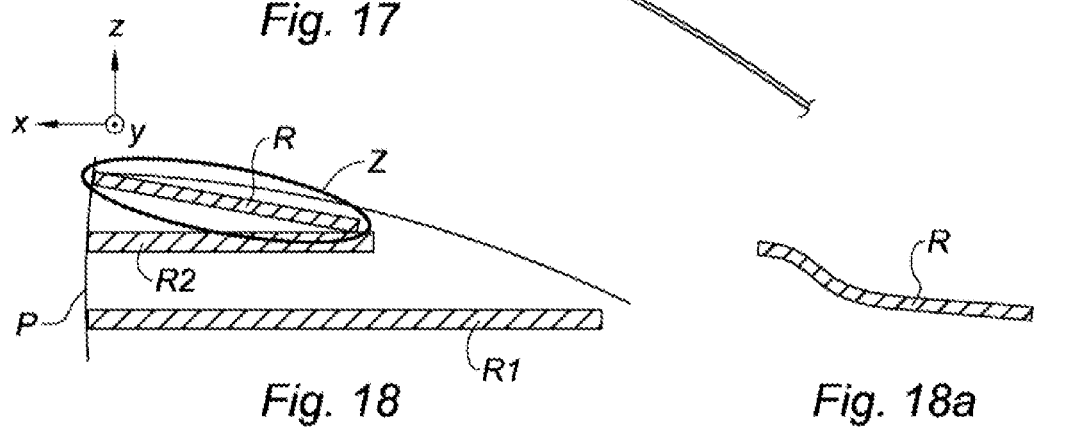
FIG. 18a shows an alternative of the detail of the zone Z of FIG. 18.
Figure 19:
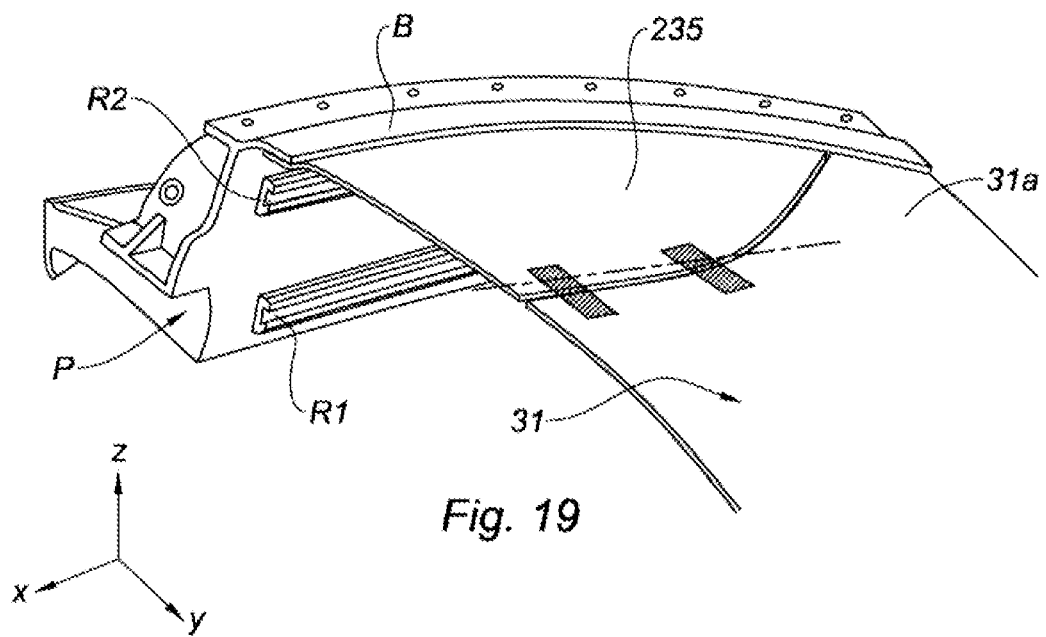

As shown in FIGS. 17 and 18, the opening of the panel 235 toward the inside of the sliding cowl 31 may be obtained by suitable guiding of that panel using the rail R secured to the beam P that is located at the top of the nacelle, and which enables the connection thereof with the pylon 14.

More specifically, as shown in FIG. 18, this rail R may be inclined with respect to the primary R1 and secondary R2 rails in which the outer 31a and inner 31b skins of the moving cowl 31 slide, respectively, or may assume any suitable shape like that shown in FIG. 18a, making it possible to optimize the desired flows of air.

In the alternatives shown in FIGS. 19 to 25, the panel 235 is no longer guided by a rail, but by a simple border B secured to the beam P, against which it is elastically recalled, a strip of material with a low friction coefficient such as Teflon T being able to be inserted between said border B and said panel 235.

More specifically, in the alternatives of FIGS. 20 and 21, spring means RE, positioned in the region where the hinges C articulating the panel 235 relative to the outer skin 31a of the cowl 31 are found, return the panel 235 into contact with the border B.

In the alternative of FIG. 20, the edge of the panel P that is in contact with the border B has an indentation D making it possible to obtain an optimal aerodynamic profile.

In the alternative shown in FIGS. 22 and 23, the moving panel 235 is no longer articulated on the outer skin 31a of the moving cowl 31, but is kept bearing against the border B due solely to its elasticity.

More specifically, in the alternative of FIG. 22, this panel 235 is an attached piece, mounted stationary in the outer skin 31a of the moving cowl 31, and having greater elasticity than that cowl.

In the alternative of FIG. 23, this panel 235 is an integral part of the outer skin 31a of the moving cowl, and is formed in part of the outer skin that has a greater elasticity.

As shown in FIGS. 24 and 25, during sliding of the moving cowl 31 from its normal position (FIG. 24) toward its thrust reversal position (FIG. 25), the panel 235 is guided toward its opening position by the border B.

Figure 26:
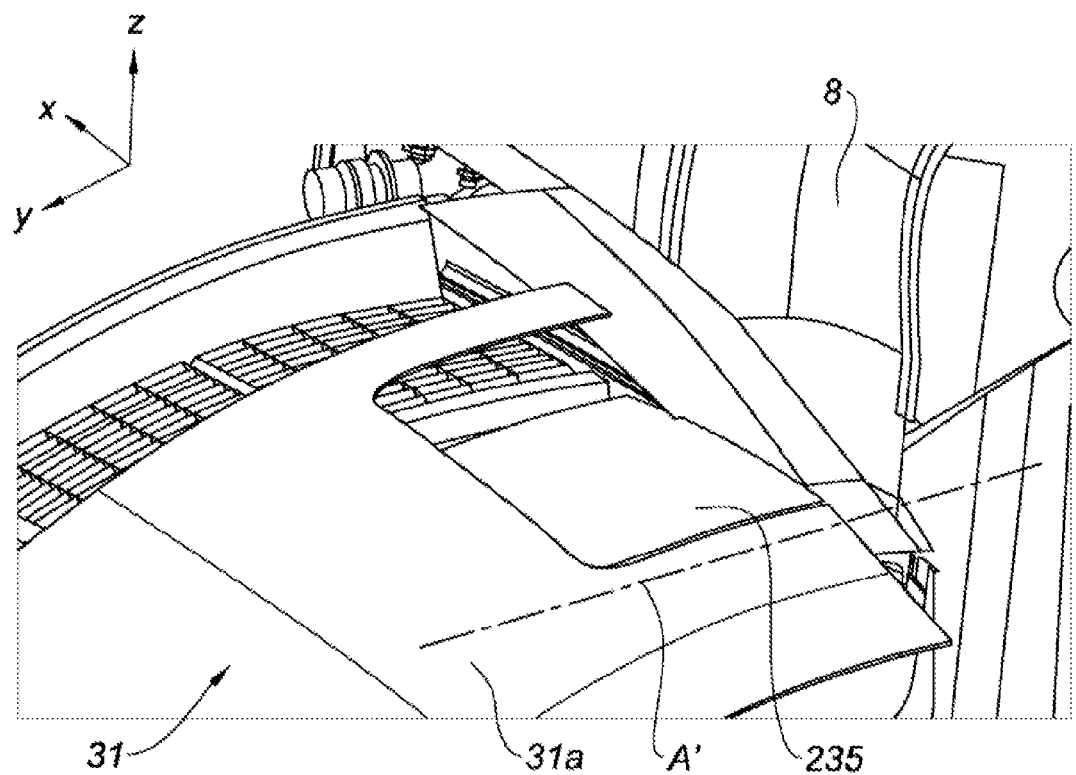
Figure 27:
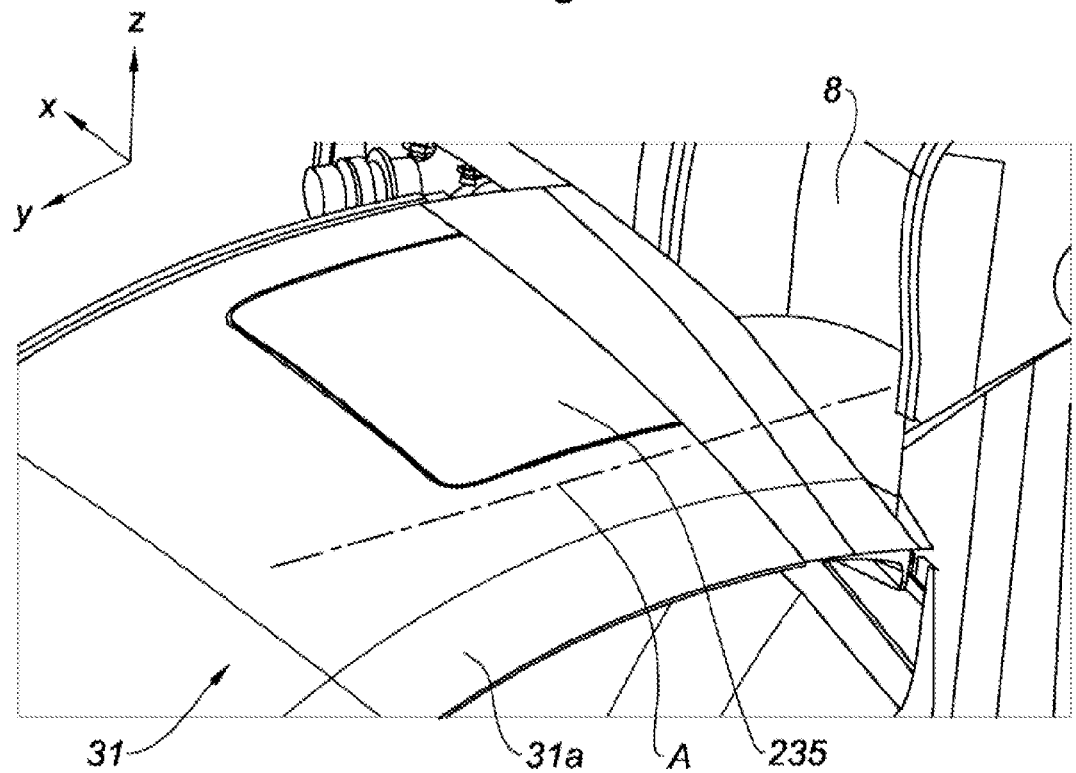

In the form of FIGS. 26 and 27, the second panel 235 is also pivotably mounted on the outer skin 31a of the sliding cowl 31, but the axis of rotation A' in that case extends in a direction substantially parallel to the axis Y.

Although the present disclosure has been described with a particular exemplary form, it is quite obvious that it is by no means limited thereto and that it comprises all the technical equivalents of the described means, as well as their combinations if the latter enter the scope of the present disclosure.

What is claimed is:

1. A nacelle for a bypass turbofan engine comprising:
   an upstream section through which a flow of air penetrates,
   a middle section surrounding a fan of the turbofan engine, and
   a downstream section comprising an inner fixed structure and an outer structure delimiting a tunnel through which the flow of air flows, the outer structure comprising at least one cowl mounted on the inner fixed structure and movable along a longitudinal axis (Δ) of the nacelle so as to allow evacuation of at least part of the flow of air circulating in the tunnel during a thrust inversion phase of the nacelle, the nacelle also having a top receiving a fastening pylon for a wing of an aircraft, the nacelle comprising:
   at least one first panel mounted on the inner fixed structure of one side of the top of the nacelle, the first panel being fixed and arranged to limit physical interference of said cowl with an element of the wing during thrust reversal, and
   at least one second panel mounted on an opposite side of the top of the nacelle, said second panel being movable relative to the inner fixed structure and arranged to increase air discharged from the nacelle during thrust reversal.

2. The nacelle according to claim 1, wherein the first panel is selected from the group consisting of a panel fixed to the inner fixed structure and stationary or at least partially movable with respect to the inner fixed structure, and a panel fixed to said cowl and stationary or at least partially movable with respect to said cowl.

3. The nacelle according to claim 1, wherein said second panel is selected from the group consisting of a panel fixed to the cowl, a panel fixed to the inner fixed structure and comprising at least one movable portion with respect to the inner fixed structure, and a panel movably mounted on said cowl.

4. The nacelle according to claim 3, wherein the second panel is secured to said cowl.

5. The nacelle according to claim 1, wherein the first panel and/or the second panel include at least one movable part configured to go from a closed position preventing a part of the flow of air from escaping to an open position allowing such escape.

6. The nacelle according to claim 5, wherein the movable part of the first panel and/or the second panel is configured to assume several intermediate positions.

7. The nacelle according to claim 5, wherein the movable part is pivotably mounted on the inner fixed structure around an axis substantially parallel to the longitudinal axis of the nacelle.

8. The nacelle according to claim 5, wherein the movable part is pivotably mounted on an outer skin of said cowl toward the inside thereof, around an axis chosen from among the group consisting of a substantially parallel axis, and a substantially perpendicular axis, with respect to the longitudinal axis ($\Delta$) of the nacelle.

9. The nacelle according to claim 8, wherein said movable part is guided by means selected from among the group consisting of a rail, and a border secured to a beam situated at the top of said nacelle.

10. The nacelle according to claim 5, wherein said movable part is secured to an outer skin of said cowl, and movable due to elasticity of said movable part.

11. The nacelle according to claim 1, wherein said second panel is connected to said inner fixed structure by hinges and several connecting rods, whereof at least one connecting rod is fixed on said second panel and on the cowl and a second connecting rod is fixed on said second panel and on the inner fixed structure.

12. The nacelle according to claim 1, wherein the first and second panels have a substantially symmetrical shape with respect to the top of the nacelle.

13. The aircraft including the wing and said nacelle according to claim 1 connected by the fastening pylon.

* * * * *